United States Patent
Subramaniam et al.

(10) Patent No.: US 10,091,023 B2
(45) Date of Patent: Oct. 2, 2018

(54) SYSTEMS AND METHODS TO DETECT AND RECOVER FROM A LOOP IN AN ETHERNET RING PROTECTED NETWORK

(71) Applicant: Ciena Corporation, Hanover, MD (US)

(72) Inventors: Balaji Subramaniam, Petaluma, CA (US); Paul Nahlous, San Anselmo, CA (US); Terry Mitchell, Rohnert Park, CA (US); Phil Schaefer, Petaluma, CA (US)

(73) Assignee: Ciena Corporation, Hanover, MD (US)

(*) Notice: Subject to any disclaimer, the term of this patent is extended or adjusted under 35 U.S.C. 154(b) by 141 days.

(21) Appl. No.: 14/976,342

(22) Filed: Dec. 21, 2015

(65) Prior Publication Data
US 2017/0180153 A1    Jun. 22, 2017

(51) Int. Cl.
| H04L 12/437 | (2006.01) |
| H04L 12/26 | (2006.01) |
| H04L 12/931 | (2013.01) |
| H04L 12/24 | (2006.01) |

(52) U.S. Cl.
CPC ........ *H04L 12/437* (2013.01); *H04L 41/0631* (2013.01); *H04L 43/10* (2013.01); *H04L 49/354* (2013.01)

(58) Field of Classification Search
CPC ... H04L 12/437; H04L 41/0631; H04L 43/10; H04L 49/354
See application file for complete search history.

(56) References Cited

U.S. PATENT DOCUMENTS

| 7,418,005 | B2* | 8/2008 | Arima | H04L 43/50 370/461 |
| 8,018,841 | B2 | 9/2011 | Holness et al. | |
| 8,149,692 | B2 | 4/2012 | Holness et al. | |
| 8,305,938 | B2 | 11/2012 | Holness et al. | |
| 8,509,061 | B2 | 8/2013 | Holness et al. | |
| 8,588,060 | B2 | 11/2013 | Holness | |
| 8,625,594 | B2* | 1/2014 | Safrai | H04L 49/35 370/392 |
| 8,737,201 | B2* | 5/2014 | Tochio | H04L 12/437 370/225 |
| 9,001,644 | B2* | 4/2015 | Salam | H04L 41/0677 370/222 |
| 9,042,216 | B2 | 5/2015 | Rose | |
| 9,660,896 | B2* | 5/2017 | St-Laurent | H04L 43/50 |

(Continued)

OTHER PUBLICATIONS

ITU-T Recommendation G.8032/Y.1344 (Aug. 2015), Ethernet ring protection switching.

*Primary Examiner* — Asad M Nawaz
*Assistant Examiner* — Thomas R Cairns
(74) *Attorney, Agent, or Firm* — Clements Bernard Walker PLLC; Christopher L. Bernard; Lawrence A. Baratta, Jr.

(57) ABSTRACT

Loop detection systems and methods in an Ethernet Ring Protected network include, subsequent to creating a loop detection service on all nodes in the network, periodically transmitting a loop detection frame on both ports of the node; responsive to failing to receive the loop detection frame at the node, determining no loop exists in the ring; and, responsive to receiving the loop detection frame on a received port at the node, determining a loop exists in the ring and automatically implementing one or more recovery actions.

20 Claims, 5 Drawing Sheets

(56) References Cited

U.S. PATENT DOCUMENTS

| | | | |
|---|---|---|---|
| 2006/0013141 A1* | 1/2006 | Mutoh | H04L 12/462 |
| | | | 370/241 |
| 2009/0161562 A1 | 6/2009 | Shah et al. | |
| 2009/0168646 A1 | 7/2009 | Wang et al. | |
| 2011/0040898 A1* | 2/2011 | Kim | H04L 12/413 |
| | | | 709/251 |
| 2011/0075584 A1 | 3/2011 | Teramoto | |
| 2012/0033666 A1 | 2/2012 | Holness et al. | |
| 2012/0314565 A1 | 12/2012 | Ding et al. | |
| 2013/0021901 A1 | 1/2013 | Ding et al. | |
| 2013/0114400 A1 | 5/2013 | Zhang et al. | |
| 2013/0258840 A1 | 10/2013 | Holness et al. | |
| 2015/0055451 A1 | 2/2015 | Holmberg et al. | |
| 2015/0085637 A1 | 3/2015 | Nahlous et al. | |
| 2015/0085641 A1 | 3/2015 | Cecil | |
| 2015/0207668 A1 | 7/2015 | Civil et al. | |
| 2016/0204976 A1* | 7/2016 | Singh | H04L 12/413 |
| | | | 370/216 |
| 2017/0111186 A1* | 4/2017 | Tochio | H04L 12/465 |

* cited by examiner

SYSTEMS AND METHODS TO DETECT AND RECOVER FROM A LOOP IN AN ETHERNET RING PROTECTED NETWORK

FIELD OF THE DISCLOSURE

The present disclosure generally relates to networking systems and methods. More particularly, the present disclosure relates to systems and methods to detect and recover from a loop in an Ethernet Ring Protected network.

BACKGROUND OF THE DISCLOSURE

Ethernet Ring Protection Switching, or ERPS, is described, for example, in ITU-T Recommendation G.8032/Y.1344 (08/15), the contents of which are incorporated by reference. G.8032v1 supported a single ring topology and G.8032v2 supports multiple rings/ladder topology. By virtue of its topology, ring based networks, which have learning and flooding on the Layer 2 Ethernet domain, are prone to data packet loops. The G.8032 standard is based on a scheme in which loop-avoidance is the most important criterion as far as protocol specification is concerned. However, during deployment and operation, provisioning related aspects, hardware related aspects, and protocol related aspects all have the potential to cause loops in Ethernet rings. The provisioning related aspects can include, for example, adding removing/modifying ports, Warm/Cold reboot of nodes, changing Virtual Local Area Network (e.g., Broadcast VLAN IDs (B-VID)) or Media Access Control (MAC) (e.g., Destination B-MAC), changing the Admin State of a Ring Protection Group (RPG), changing other provisioning parameters on the RPG (e.g., moving from single card to cross-card and vice-versa, etc.), adding/modifying/removing FlowPoints in active Rings, Virtual Port changes/invalid configuration, incorrect User Provisioning of services (connecting multiple Main Rings at multiple locations), and the like. The hardware related aspects can include issues with blocking Application Programming Interfaces (APIs), issues with forwarding/dropping of Ring-Automatic Protection Switching (R-APS) control frames, issues with flooding/learning behavior, and the like. The protocol related aspects can include, for example, states mismatch/getting stuck due to R-APS messages not getting forwarded (due to error or mis-provisioning in upstream/downstream nodes), blocking/forwarding behavior change due to timing related issues, event handling (Missing Port/Continuity Check Message (CCM) Up/Down detection), events detected on the edge of timers (hold-off, guard etc.).

There are conventional mitigation strategies to address some of the aforementioned causes of loops. The G.8032 protocol, by definition, is designed around loop-avoidance, and conformance testing the protocol stack would ensure the protocol related issues are covered to a large extent. For scenarios not specified well by the standard, a conservative approach can include ports coming up always blocked, usage of guard timers to ensure frames that cross each other are dropped, dropping R-APS control frames checking for self Node ID in the R-APS packet, etc. to name a few. Comprehensive System testing and automation testing can catch some of the errors related to user provisioning, and standalone hardware testing can ensure the Hardware/Switch related API's work as specified.

In spite of the conventional mitigation strategies, there can be instances where loops occur, and the adverse condition typically manifests as one of the below:

1. All ports in the ring show as unblocked (forwarding) on in a Network Management System (NMS), i.e., no blocked port on any of the participating nodes in the ring;
2. One (or more) port(s) show blocked status in the NMS, but due to internal (hardware/software) issues, the ring is not really blocked. (In essence, providing misleading information); and
3. Invalid User Provisioning: for example, connecting two Main Rings at multiple Nodes (creating loops depending on Blocking positions of Both Rings.).

These adverse conditions can bring down not only the rings involved but sometimes the line card/system and the network as well.

Another conventional approach is MAC movement which monitors a L2 MAC table to detect recurring movement of MACs between different ports. MAC movement is normal, but recurring movement is not. Detection of a loop using MAC movement requires a centralized MAC learning analysis which may not be possible in distributed systems. Also, some loops may occur that do not exhibit this condition and cannot be detected by MAC movement. With fast ERP solutions, there is a need for loop detection as a second and more robust line of defense.

BRIEF SUMMARY OF THE DISCLOSURE

In an exemplary embodiment, a loop detection method in an Ethernet Ring Protected network implemented by a node in the network, subsequent to creating a loop detection service on all nodes in the network, periodically transmitting a loop detection frame on both ports of the node; responsive to failing to receive the loop detection frame at the node, determining no loop exists in the ring; and, responsive to receiving the loop detection frame on a received port at the node, determining a loop exists in the ring and automatically implementing one or more recovery actions. The loop detection service can be an Ethernet Virtual Local Area Network (E-VLAN) service on the ring. The one or more recovery actions can include implementing a forced switch on the received port. The one or more recovery actions can include shutting down the received port subsequent to determining the loop after implementing a forced switch on the received port. The received loop detection frame can include data added by each node in the network, and the one or more recovery actions can include providing one of a notification and an alarm to an operator with the added data for root cause analysis. The loop detection method can further include, upon initially creating the ring, performing a test of the loop detection service with an intentionally caused loop to determine operational status of the loop detection service prior to the ring carrying traffic. The transmitting can be performed at least every one second in hardware. The ring can include a Major Ring and the node can be part of a second Ring including a Sub-Ring, and the method can further include participating in a second loop detection service for the Sub-Ring.

In another exemplary embodiment, a loop detection apparatus for a node in an Ethernet Ring Protected network includes circuitry adapted to, subsequent to creation of a loop detection service on all nodes in the network, periodically transmit a loop detection frame on both ports of the node; circuitry adapted to, responsive to a failure to receive the loop detection frame at the node, determine no loop exists in the ring; and circuitry adapted to, responsive to reception of the loop detection frame on a received port at the node, determine a loop exists in the ring and automatically implementing one or more recovery actions. The loop detection service can be an Ethernet Virtual Local Area Network (E-VLAN) service on the ring. The one or more recovery actions can include implementation of a forced switch on the received port. The one or more recovery actions can include shutting down the received port subsequent to determining the loop after implementing a forced switch on the received port. The received loop detection frame can include data added by each node in the network, and the one or more recovery actions can include one of a notification and an alarm to an operator with the added data for root cause analysis. The loop detection apparatus can further include circuitry adapted to, upon initially creating the ring, perform a test of the loop detection service with an intentionally caused loop to determine operational status of the loop detection service prior to the ring carrying traffic. The circuitry adapted to periodically transmit can provide the loop detection frame at least every one second in hardware. The ring can include a Major Ring and the node can be part of a second Ring including a Sub-Ring, and the apparatus can further include circuitry adapted to participate in a second loop detection service for the Sub-Ring.

In a further exemplary embodiment, an Ethernet Ring Protected network includes a plurality of nodes communicatively coupled to one another; wherein a first Ethernet ring is provisioned through the plurality of nodes with a designated Ring Protection Link (RPL) owner; wherein a loop detection service is provisioned on the first Ethernet ring, wherein the loop detection service includes periodic transmission of a loop detection frame on both ports of a node on the first Ethernet ring, wherein the loop detection service is adapted to determine whether or not a loop exists on the first Ethernet ring, and, responsive to detection of the loop, the node is adapted to cause automatic implementation of one or more recovery actions. A second Ethernet ring can be provisioned through the plurality of nodes with a second designated RPL owner, and wherein a second loop detection service can be provisioned on the second Ethernet ring. The one or more recovery actions can include one or more of implementation of a forced switch on the received port and shutting down the received port. The received loop detection frame can include data added by each node in the network, and the one or more recovery actions can include one of a notification and an alarm to an operator with the added data for root cause analysis.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, in various exemplary embodiments, the present disclosure relates to systems and methods to detect and recover from a loop in an Ethernet Ring Protected network. The systems and methods provide an automatic hardware-based approach to detect quickly loops and initiate recovery. In an exemplary embodiment, the systems and methods utilize an Ethernet Virtual Local Area Network (E-VLAN) service provisioned on an Ethernet ring to detect automatically loops and cause failure recovery. The recovery can include a standard forced switch to correct a detected loop as well as providing a familiar, straightforward approach to clear automatically the detected loop using standard G.8032 processes. If the forced switch does not correct the loop, i.e., a loop is detected subsequent to the forced switch, the physical port can be disabled for all traffic to guarantee the loop is corrected. The systems and methods can include adding custom data to a forced switch APS message to provide an effective time stamp to all nodes in the ring to aid in root cause analysis. In an exemplary embodiment, a loop detection test function can intentionally introduce a loop in the ring, upon first installing the ring, to ensure the systems and methods operate properly.

The systems and methods can be used to detect and recover from a loop in an Ethernet Ring Protected network based on G.8032v2. A hardware-based loop detection service is installed and may utilize a Metro Ethernet Forum (MEF) standard E-VLAN service on the ring. The hardware can periodically transmit an Ethernet frame in both directions around the ring from the Ring Protection Link (RPL) owner node or another node. If the Ethernet frame traverses the ring and returns to the sender (i.e., the RPL owner node or another node), a loop exists. For example, if the sender is the RPL owner node and the node receives the Ethernet frame on its other ring port, a VLAN translation process can add VLANs to identify the message type and ring instance and port instance involved. The VLANs allow the hardware to translate the Ethernet frame header into ring and port IDs. The loop detection service utilizes the data path in a standard way without constraints on the L2 MAC learning processes or other system capabilities. Directly monitoring the data path, via the loop detection service, is a better technique for detecting a loop in the data path.

When a loop is detected, the RPL can be put into a standard forced switch condition which solves the immediate problem. An alarm is raised to alert the user to the loop and forced switch condition. This action does not adversely affect traffic on the ring since the result is a single blocked ring port as the G.8032 standard requires. The ensuing forced switch APS messages contain new information so all other nodes in the ring can log the occurrence of the loop as an effective timestamp for further root cause analysis. Once the loop is alarmed and recovered, the user can clear the forced switch condition to clear the alarm and restore the ring to the idle state. If the loop still exists, the loop is immediately rediscovered using the systems and methods and return to the alarmed state as well as physically disabling the port to guarantee the loop is blocked. The user can then investigate the cause of the loop. Some ring state inconsistencies are corrected by the process of applying and clearing the forced switch. Others require user investigation.

There is generally no confirmation that loop detection is functioning properly because without a loop there is no feedback, so a test function that ensures the detection mechanism is working properly is also provided. The test intentionally creates a loop in the network by unblocking the ring protection link just long enough to inject a few test frames into the network. If those frames traverse the ring, then the loop detection service can be verified. If the frames do not return, then it is known that the service has not been provisioned properly, and the user is notified.

Figure 1:
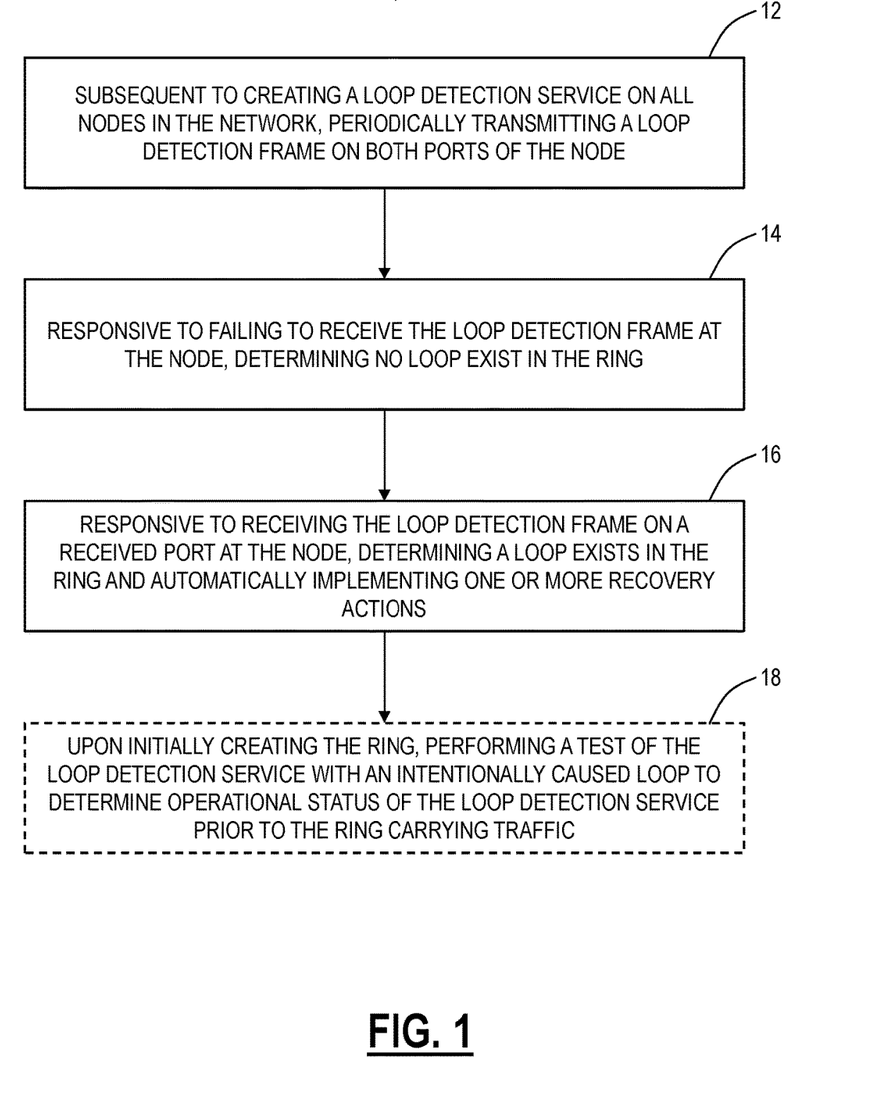
FIG. 1 is a flowchart of a loop detection process in an Ethernet Ring Protected network implemented by a node in the network.

Referring to FIG. 1, in an exemplary embodiment, a flowchart illustrates a loop detection process 10 in an Ethernet Ring Protected network implemented by a node in the network. The loop detection process 10 includes, subsequent to creating a loop detection service on all nodes in the network, periodically transmitting a loop detection frame on both ports of the node (step 12); responsive to failing to receive the loop detection frame at the node, determining no loop exist on the ring (step 14); and, responsive to receiving the loop detection frame on a received port at the node, determining a loop exists in the ring and automatically implementing one or more recovery actions (step 16). The loop detection process 10 includes the creation of a new service on a Network-Network Interface (NNI) ring which can be referred to as a loop detection service. The loop detection service operates to detect loops on a per-ring basis, i.e., if there are multiple NNI rings on a physical port of the node, each ring can detect loops individually through its own loop detection service. The loop detection service can be an Ethernet Virtual Local Area Network (E-VLAN) service on the ring.

Upon detecting a loop, the loop detection process 10 can include performance of one or more recovery actions such as, for example, implementing a forced switch on the received port, shutting down the received port, and/or providing one of a notification and an alarm to an operator with added data for root cause analysis. For example, as part of the loop detection service, each node in the ring can add data to the loop detection frame. For shutting down the received port, this includes physically disabling the port which may cause other rings and line protection groups on that physical port to switch as well. This behavior is acceptable in scenarios where the loop is caused by hardware and/or software on the physical port. For example, the forced switch may not actually work due to the hardware and/or software on the physical port. Shutting down the physical port on other potentially unaffected rings is more preferable than waiting for each one of them to fail individually, thus avoiding a cascading effect. In an exemplary embodiment, the forced switch can be a first recovery action and if a loop is detected subsequent to the forced switch, the port can be physically disabled thereby guaranteeing the loop is corrected. Note, the port disable can affect other traffic on the port, but is preferable to having open loops in the network. Also, a standing alarm can be created against the remote port (e.g., link down) alerting operators that there is a failed condition in the network. An event can also be generated; that is recorded in the event log, as to the underlying cause of the downed port. The appropriate state of the port can be identified such that the user can clear this state.

The transmission of the loop detection frame can be performed at least every one second in hardware. In an exemplary embodiment, the loop detection frame transmission interval can be 2 sec. The loop detection service is implemented in hardware, software, and/or firmware. In an exemplary embodiment, the loop detection service can be implemented in Field Programmable Gate Arrays (FPGAs) and perform the recovery action. In an exemplary embodiment, the recovery action is performed in hardware to shut automatically off or force switch the port and software can poll the hardware (e.g., FPGA) to determine if a loop is detected to raise an alarm against the physical port where the loop was detected. The alarm can be cleared when the user intervenes. For example, the user can administratively lock the physical port. Alternatively, the physical port can be denoted in a "loop avoidance" state. Also, the physical port can be shut off, as well as some combination of the foregoing. Again, the forced switch can be the first recovery while shutting off the physical port can be performed only if the forced switch does not correct the loop.

In an exemplary embodiment, the node can be the RPL owner node and the physical port where the loop is detected can be the blocked port on the Ethernet ring. In other exemplary embodiments, the node can be any node in the Ethernet ring. For proper operation, the loop avoidance service should have a single node per ring sourcing the loop detection frames and that same single node responsible for detecting the loop detection frames. Note, in proper operation with no loops, the loop avoidance frames should not be received by the single node. The loop detection service should operate at each node in the ring to receive the loop detection frames on one port and retransmit the loop detection frames on the other port with data added therein for root cause analysis, if applicable.

The loop detection process 10 can include, upon initially creating the ring, performing a test of the loop detection service with an intentionally caused loop to determine the operational status of the loop detection service prior to the ring carrying traffic. As described herein, there is no confirmation that the loop detection service is functioning properly because, without a loop, there is no feedback. Here, the loop detection process 10 can include a test function that ensures the detection mechanism is working properly. The test intentionally creates a loop in the ring by unblocking the RPL just long enough to inject a few test frames into the ring. If those frames traverse the ring, then the loop detection service can be verified. If the frames do not return, then it is known that the service has not been provisioned properly, and the user is notified. This test can be performed initially upon configuration of the ring prior to carrying traffic.

The ring can include a Major Ring (MR), and the node can be part of a second Ring including a Sub-Ring. The loop detection process 10 can further include participating in a second loop detection service for the Sub-Ring. Note, the loop detection process 10 operates on a per ring basis with the loop detection service operating for each ring. The node can participate in multiple loop detection services for multiple rings thereon.

In another exemplary embodiment, a loop detection apparatus for a node in an Ethernet Ring Protected network includes circuitry adapted to, subsequent to creation of a loop detection service on all nodes in the network, periodically transmit a loop detection frame on both ports of the node; circuitry adapted to, responsive to a failure to receive the loop detection frame at the node, determine no loop exists in the ring; and circuitry adapted to, responsive to reception of the loop detection frame on a received port at the node, determine a loop exists in the ring and automatically implementing one or more recovery actions.

Figure 2:
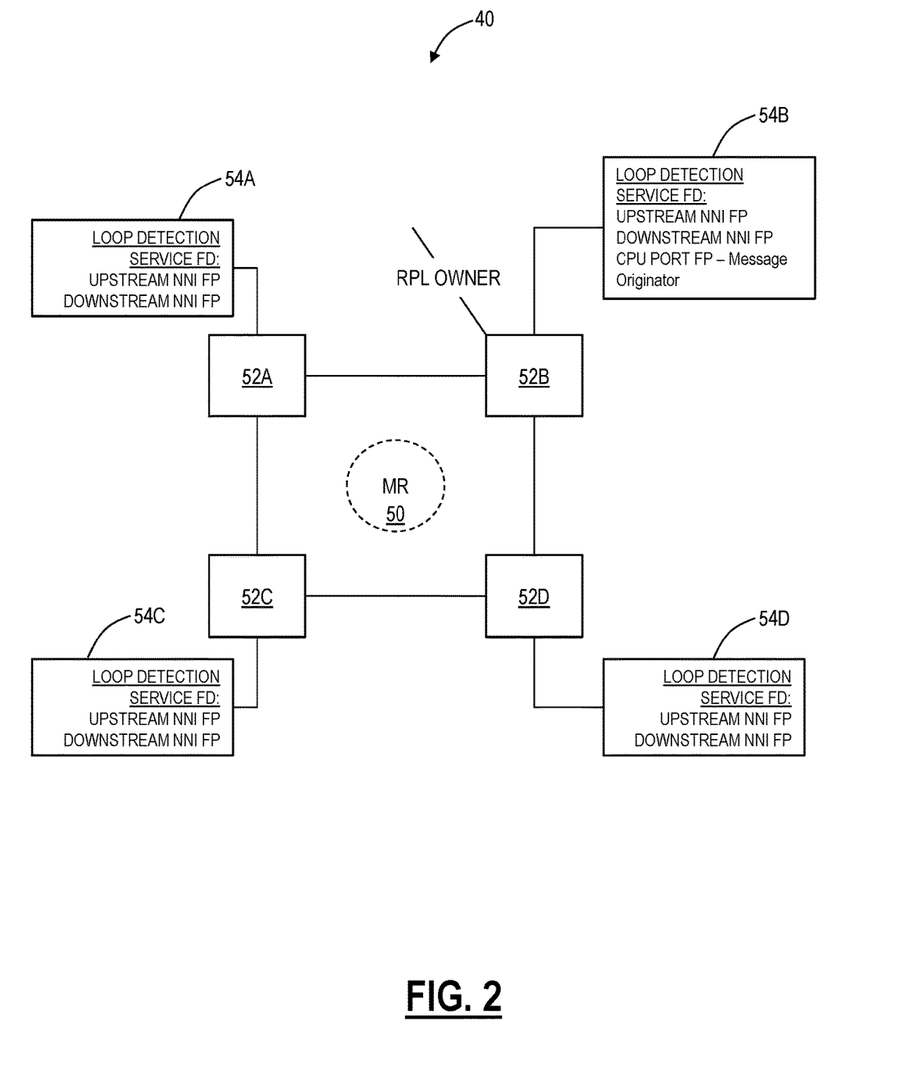
FIG. 2 is a network diagram of a network with an Ethernet ring with four nodes for describing the loop detection process of FIG. 1 on a single Major Ring (MR)

Referring to FIG. 2, in an exemplary embodiment, a network diagram illustrates a network 40 with an Ethernet ring 50 with four nodes 52A, 52B, 52C, 52D for describing the loop detection process 10 on a single MR. The nodes 52A, 52B, 52C, 52D can be switches, routers, network elements, etc. supporting Ethernet switching thereon and Ethernet Ring Protection. For illustration purposes, the nodes 52A, 52B, 52C, 52D are shown in a physical ring, but those of ordinary skill in the art will recognize other topologies are contemplated with more or fewer nodes 52.

The loop detection process 10 includes creating a loop detection service 54, denoted as a loop detection service 54A, 54B, 54C, 54D operating on the associated nodes 52A, 52B, 52C, 52D. In the example of FIG. 2, the node 52B is the RPL owner and the designated node sourcing the loop detection frames in the loop detection process 10. The loop detection service 54 is configured to source/sink the loop detection frames at the node 52B and to forward the loop detection frames at the other nodes 52A, 52C, 52D. Accordingly, the loop detection service 54 includes a flow domain which contains flow points from each of the legs at all of the nodes 52. Hardware on a module or card at the node 52B is added to the flow domain as the RPL owner.

The loop detection service 54B on the RPL owner node 52B originates the loop detection frame, e.g., an FPGA originates a message on a processor port. The loop detection frame can be an Ethernet frame with a node specific MAC as the source MAC (e.g., the source MAC of the node 52B), the destination MAC can be a well-known multicast MAC (e.g., 01:19:A7:00:00:01), an inner VLAN ID can be a ring identifier attribute of the MR ring 50, the outer VLAN ID can be 100, and the priority can be 7.

The processor port flow point can have an egress translation rule to change the inner VLAN ID to the ring ID of the MR and outer VLAN ID as 100. These are for the packets that arrive at the NNI flow point and egress out of the processor port towards the FPGA. Again, the loop detection frame can be sent every two seconds or some other time period. If there are no blocked ports (due to any reason), the loop detection frame will be received back by the originating FPGA, which will check the source MAC for its own MAC and on a match, shut down the RPL port, force switch the RPL port, etc. The software would poll the FPGA status and on detection of a port shutdown by an FPGA, raise an alarm against the physical port.

Figure 3:
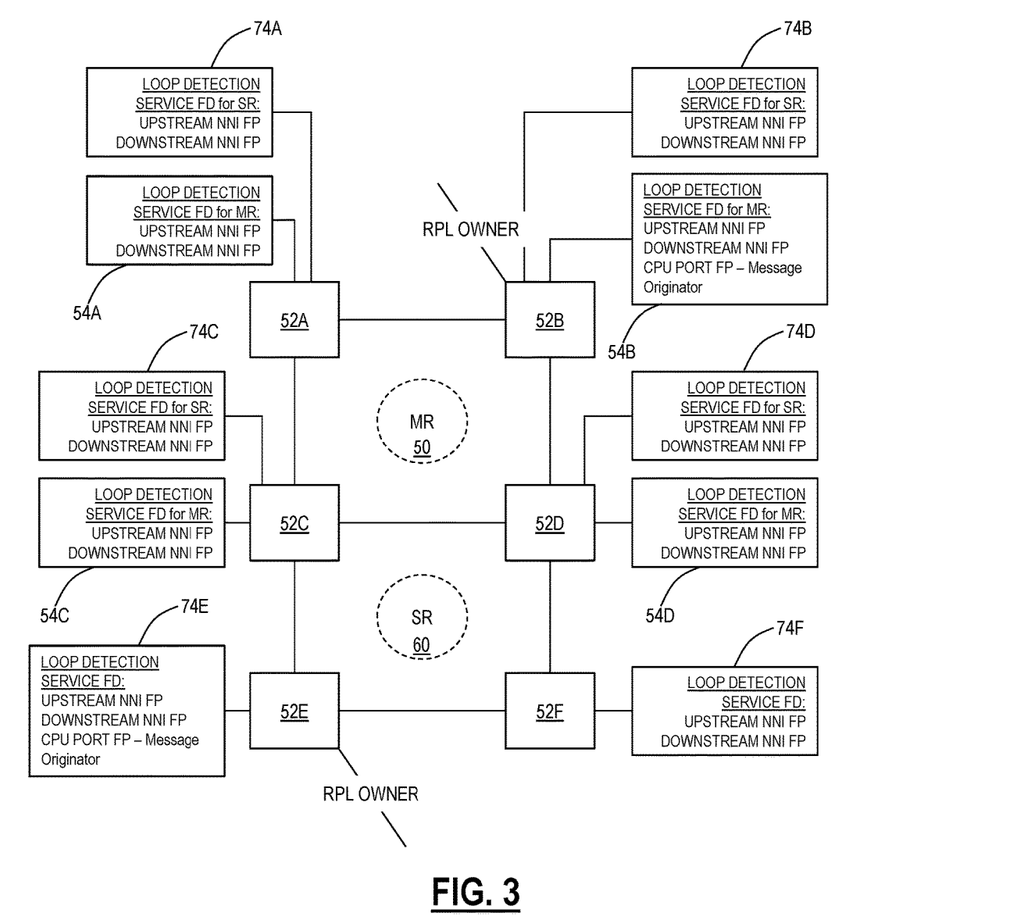
FIG. 3 is a network diagram of a network with the Ethernet ring with four nodes and an Ethernet ring with six nodes for describing the loop detection process on a MR and a Sub-Ring (SR)

Referring to FIG. 3, in an exemplary embodiment, a network diagram illustrates a network 60 with the Ethernet ring 50 with four nodes 52A, 52B, 52C, 52D and an Ethernet ring 70 with six nodes 52A, 52B, 52C, 52D, 52E, 52F for describing the loop detection process 10 on a MR and a SR. Here, the Ethernet ring 50 is the MR with the RPL owner as the node 52B and the Ethernet ring 60 is the SR with the RPL owner as the node 52E. The loop detection service 54, denoted as a loop detection service 54A, 54B, 54C, 54D operating on the associated nodes 52A, 52B, 52C, 52D, operates on the MR. A loop detection service 74, denoted as a loop detection service 74A, 74B, 74C, 74D, 74E, 74F operating on the associated nodes 52A, 52B, 52C, 52D, 52E, 52F, operates on the SR. The loop detection service 74 operates in a similar manner as described for the loop detection service 54. Note, the nodes 52A, 52B, 52C, 52D each operate both the loop detection services 54, 74. The loop detection services 54, 74 can detect loops in the rings 50, 70 that are created due to invalid states in the configuration and/or operation.

The loop detection services 54, 74 can include capturing a loop detection service ID in the RPG. Each port on the nodes 52 can have an addition loop avoidance state. The loop detection services 54, 74 can include resource manager additions to create a new flow domain and flow points. The hardware on the nodes 52 can support origination, termination, and verification of the loop detection frames along with mechanisms to support the recovery actions.

In other exemplary embodiments, service Operation, Administration, and Maintenance (OAM) Maintenance End Points (MEP) can be used to detect loops. This can be similar to the above description for the loop detection services 54, 74, except the detection of a loop is handled by OAM logic/circuitry. In another exemplary embodiment, Traffic Engineered Service Instances (TESIs) and drop statistics (on blocked ports) can be used to identify loops. This does not cover all of the possible scenarios, such as one-way failures, inconsistent drop counters, etc. Also, custom R-APS messages could traverse the rings 40, 70 and count blocking ports. However, this does not truly monitor the data path, i.e., there may be cases where a provisioning issue causes a loop that would not be detected).

Figure 4:
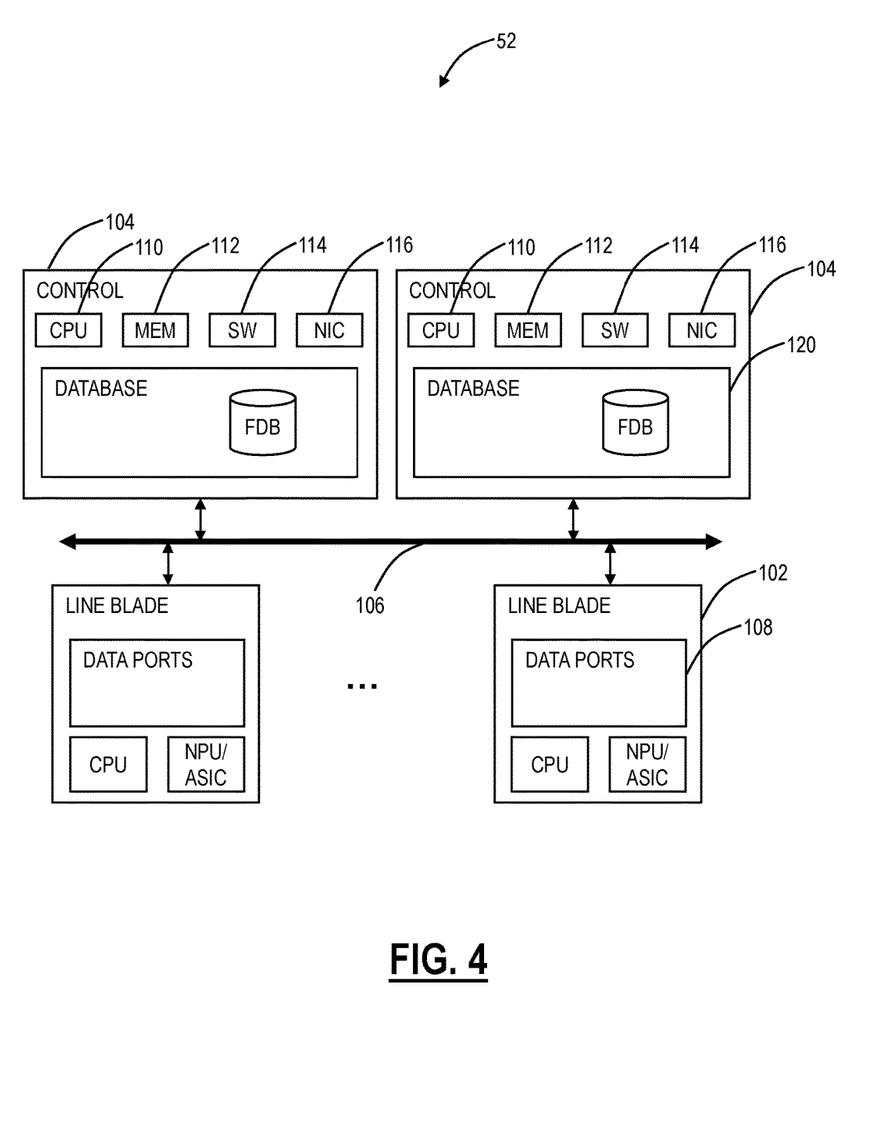
FIG. 4 is a block diagram of an exemplary implementation of a node in the Ethernet rings of FIGS. 2 and 3.

Referring to FIG. 4, in an exemplary embodiment, a block diagram illustrates an exemplary implementation of a node 100. The nodes 52 can be implemented as the node 100. In this exemplary embodiment, the node 100 is an Ethernet network switch, but those of ordinary skill in the art will recognize the systems and methods described herein contemplate other types of network elements and other implementations. In this exemplary embodiment, the node 100 includes a plurality of blades 102, 104 interconnected via an interface 106. The blades 102, 104 are also known as line cards, line modules, circuit packs, pluggable modules, etc. and generally refer to components mounted on a chassis, shelf, etc. of a data switching device, i.e., the node 100. Each of the blades 102, 104 can include numerous electronic devices and optical devices mounted on a circuit board along with various interconnects including interfaces to the chassis, shelf, etc.

Two exemplary blades are illustrated with line blades 102 and control blades 104. The line blades 102 generally include data ports 108 such as a plurality of Ethernet ports. For example, the line blade 102 can include a plurality of physical ports disposed on an exterior of the blade 102 for receiving ingress/egress connections. Additionally, the line blades 102 can include switching components to form a switching fabric via the backplane 106 between all of the data ports 108 allowing data traffic to be switched between the data ports 108 on the various line blades 102. The switching fabric is a combination of hardware, software, firmware, etc. that moves data coming into the node 100 out by the correct port 108 to the next node 100. "Switching fabric" includes switching units, or individual boxes, in a node; integrated circuits contained in the switching units; and programming that allows switching paths to be controlled. Note, the switching fabric can be distributed on the blades 102, 104, in a separate blade (not shown), or a combination thereof. The line blades 102 can include an Ethernet manager (i.e., a CPU) and a Network Processor (NP)/Application Specific Integrated Circuit (ASIC). As described herein, the line blades 102 can include the hardware, software, and/or firmware to implement the loop detection process 10, the loop detection services 54, 74, etc.

The control blades 104 include a microprocessor 110, memory 112, software 114, and a network interface 116. Specifically, the microprocessor 110, the memory 112, and the software 114 can collectively control, configure, provision, monitor, etc. the node 100. The network interface 116 may be utilized to communicate with an element manager, a network management system, etc. Additionally, the control blades 104 can include a database 120 that tracks and maintains provisioning, configuration, operational data and the like. The database 120 can include a Forwarding Database (FDB). In this exemplary embodiment, the node 100 includes two control blades 104 which may operate in a redundant or protected configuration such as 1:1, 1+1, etc. In general, the control blades 104 maintain dynamic system information including Layer two forwarding databases, protocol state machines, and the operational status of the ports 108 within the node 100.

Figure 5:
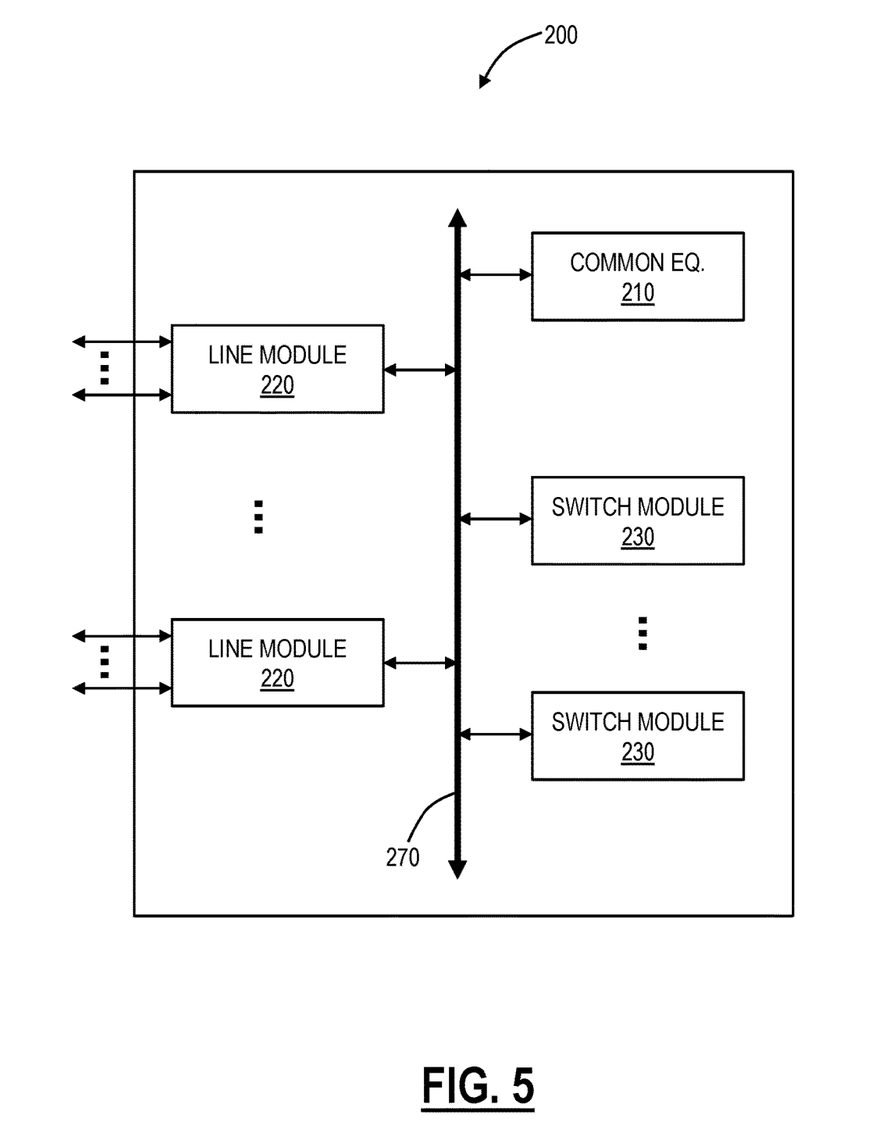
FIG. 5 is a block diagram of another exemplary implementation of a node in the Ethernet rings of FIGS. 2 and 3.

Referring to FIG. 5, in an exemplary embodiment, a block diagram illustrates another exemplary implementation of a node 200. The nodes 52 can be implemented as the node 200. For example, the node 100 can be a dedicated Ethernet switch whereas the node 200 can be a multiservice platform. In an exemplary embodiment, the node 200 can be a nodal device that may consolidate the functionality of a multi-service provisioning platform (MSPP), digital cross-connect (DCS), Ethernet and Optical Transport Network (OTN) switch, dense wave division multiplexed (DWDM) platform, etc. into a single, high-capacity intelligent switching system providing Layer 0, 1, and 2 consolidations. In another exemplary embodiment, the node 200 can be any of an OTN add/drop multiplexer (ADM), a multi-service provisioning platform (MSPP), a digital cross-connect (DCS), an optical cross-connect, an optical switch, a router, a switch, a WDM terminal, an access/aggregation device, etc. That is, the node 200 can be any system with ingress and egress signals and switching of channels, timeslots, tributary units, wavelengths, etc. While the node 200 is generally shown as an optical network element, the systems and methods are contemplated for use with any switching fabric, network element, or network based thereon.

In an exemplary embodiment, the node 200 includes common equipment 210, one or more line modules 220, and one or more switch modules 230. The common equipment 210 can include power; a control module; operations, administration, maintenance, and provisioning (OAM&P) access; and the like. The common equipment 210 can connect to a management system such as a network management system (NMS), element management system (EMS), or the like. The node 200 can include an interface 270 for communicatively coupling the common equipment 210, the line modules 220, and the switch modules 230 to one another. For example, the interface 270 can be a backplane, midplane, a bus, optical or electrical connectors, or the like. The line modules 220 are configured to provide ingress and egress to the switch modules 230 and external to the node 200. In an exemplary embodiment, the line modules 220 can form ingress and egress switches with the switch modules 230 as center stage switches for a three-stage switch, e.g., a three stage Clos switch. The line modules 220 can include optical or electrical transceivers, such as, for example, 1 Gb/s (GbE PHY), 2.5 Gb/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), etc.

Further, the line modules 220 can include a plurality of connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s. The line modules 220 can include wavelength division multiplexing interfaces, short reach interfaces, and the like, and can connect to other line modules 220 on remote network elements, end clients, edge routers, and the like. From a logical perspective, the line modules 220 provide ingress and egress ports to the node 200, and each line module 220 can include one or more physical ports. The switch modules 230 are configured to switch channels, timeslots, tributary units, wavelengths, etc. between the line modules 220. For example, the switch modules 230 can provide wavelength granularity (Layer 0 switching); OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), etc.; Ethernet granularity; etc.; and the like. Specifically, the switch modules 230 can include both Time Division Multiplexed (TDM) (i.e., circuit switching) and packet switching engines. The switch modules 230 can include redundancy as well, such as 1:1, 1:N, etc.

In various exemplary embodiments, the line modules 220 and/or the switch modules 230 can include the hardware, software, and/or firmware to implement the loop detection process 10, the loop detection services 54, 74, etc. Those of ordinary skill in the art will recognize the nodes 100, 200 can include other components which are omitted for illustration purposes, and that the systems and methods described herein are contemplated for use with a plurality of different nodes with the nodes 100, 200 presented as an exemplary type of node. For example, in another exemplary embodiment, a node may not include the switch modules 230, but rather have the corresponding functionality in the line modules 220 (or some equivalent) in a distributed fashion. For the nodes 100, 200, other architectures providing ingress, egress, and switching are also contemplated for the systems and methods described herein. In general, the systems and methods described herein contemplate use with any node providing packet switching and/or forwarding, etc.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A loop detection method in an Ethernet Ring Protected network implemented by a node in the network, the loop detection method comprising:
subsequent to creating a loop detection service on all nodes in the network, periodically transmitting a loop detection frame on both ports of the node, wherein the loop detection frame is transmitted over an Ethernet Virtual Local Area Network (E-VLAN) service in the network with the E-VLAN utilized to identify a message type of the loop detection frame, a ring instance, and a port instance, and wherein the loop detection frame comprises a first Virtual Local Area Network (VLAN) identifier identifying a message type of the loop detection frame and a second VLAN identifier identifying an associated ring and port;
responsive to failing to receive the loop detection frame at the node, determining no loop exists in the network; and
responsive to receiving the loop detection frame on a received port at the node, determining a loop exists in the network, identifying the associated ring and port from the second VLAN identifier of the loop detection frame, and automatically implementing one or more recovery actions.

2. The loop detection method of claim 1, wherein the loop detection frame comprises a source Media Access Control (MAC) address of the node, a destination MAC address which is multicast.

3. The loop detection method of claim 1, wherein the one or more recovery actions comprise implementing a forced switch on the received port.

4. The loop detection method of claim 1, wherein the one or more recovery actions comprise shutting down the received port subsequent to determining the loop after implementing a forced switch on the received port.

5. The loop detection method of claim 1, wherein the received loop detection frame comprises data added by each node in the network, and wherein the one or more recovery actions comprise providing one of a notification and an alarm to an operator with the added data for root cause analysis.

6. The loop detection method of claim 1, further comprising:
upon initially creating the ring, performing a test of the loop detection service with an intentionally caused loop to determine operational status of the loop detection service prior to the ring carrying traffic.

7. The loop detection method of claim 1, wherein the transmitting is performed at least every one second in hardware.

8. The loop detection method of claim 1, wherein the ring comprises a Major Ring and the node is part of a second Ring comprising a Sub-Ring, and further comprising:
participating in a second loop detection service for the Sub-Ring.

9. A loop detection apparatus for a node in an Ethernet Ring Protected network, the loop detection apparatus comprising:
circuitry adapted to, subsequent to creation of a loop detection service on all nodes in the network, periodically transmit a loop detection frame on both ports of the node, wherein the loop detection frame is transmitted over an Ethernet Virtual Local Area Network (E-VLAN) service in the network with the E-VLAN utilized to identify a message type of the loop detection frame, a ring instance, and a port instance, and wherein the loop detection frame comprises a first Virtual Local Area Network (VLAN) identifier identifying a message type of the loop detection frame and a second VLAN identifier identifying an associated ring and port;
circuitry adapted to, responsive to a failure to receive the loop detection frame at the node, determine no loop exists in the network; and
circuitry adapted to, responsive to reception of the loop detection frame on a received port at the node, determine a loop exists in the network, identify the associated ring and port from the second VLAN identifier of the loop detection frame, and automatically implement one or more recovery actions.

10. The loop detection apparatus of claim 9, wherein the loop detection frame comprises a source Media Access Control (MAC) address of the node, a destination MAC address which is multicast, and a VLAN identifier identifying an associated ring.

11. The loop detection apparatus of claim 9, wherein the one or more recovery actions comprise implementation of a forced switch on the received port.

12. The loop detection apparatus of claim 9, wherein the one or more recovery actions comprise shutting down the received port subsequent to determining the loop after implementing a forced switch on the received port.

13. The loop detection apparatus of claim 9, wherein the received loop detection frame comprises data added by each node in the network, and wherein the one or more recovery actions comprise one of a notification and an alarm to an operator with the added data for root cause analysis.

14. The loop detection apparatus of claim 9, further comprising:
circuitry adapted to, upon initially creating the ring, perform a test of the loop detection service with an intentionally caused loop to determine operational status of the loop detection service prior to the ring carrying traffic.

15. The loop detection apparatus of claim 9, wherein the circuitry adapted to periodically transmit provides the loop detection frame at least every one second in hardware.

16. The loop detection apparatus of claim 9, wherein the ring comprises a Major Ring and the node is part of a second Ring comprising a Sub-Ring, and further comprising:
circuitry adapted to participate in a second loop detection service for the Sub-Ring.

17. An Ethernet Ring Protected network, comprising:
a plurality of nodes communicatively coupled to one another;
wherein a first Ethernet ring is provisioned through the plurality of nodes with a designated Ring Protection Link (RPL) owner;

wherein a loop detection service is provisioned on the first Ethernet ring, wherein the loop detection service comprises periodic transmission of a loop detection frame on both ports of a node on the first Ethernet ring, wherein the loop detection service is adapted to determine whether or not a loop exists on the first Ethernet ring, and, responsive to detection of the loop, the node is adapted to cause automatic implementation of one or more recovery actions, wherein the loop detection frame is transmitted over an Ethernet Virtual Local Area Network (E-VLAN) service in the network with a first Virtual Local Area Network (VLAN) identifier utilized to identify a message type of the loop detection frame, and a second VLAN identifier utilized to identify a ring instance and a port instance.

18. The Ethernet Ring Protected network of claim 17, wherein a second Ethernet ring is provisioned through the plurality of nodes with a second designated RPL owner, and wherein a second loop detection service is provisioned on the second Ethernet ring.

19. The Ethernet Ring Protected network of claim 17, wherein the one or more recovery actions comprise one or more of implementation of a forced switch on the received port and shutting down the received port.

20. The Ethernet Ring Protected network of claim 17, wherein the received loop detection frame comprises data added by each node in the network, and wherein the one or more recovery actions comprise one of a notification and an alarm to an operator with the added data for root cause analysis.

* * * * *